United States Patent [19]

Minks, Jr.

[11] Patent Number: 5,481,837
[45] Date of Patent: Jan. 9, 1996

[54] STORM SHELTER FOR USE WITH A MOBILE HOME

[76] Inventor: William H. Minks, Jr., 3026 Graystone Manor Pkwy., Louisville, Ky. 40241

[21] Appl. No.: 321,408

[22] Filed: Oct. 11, 1994

[51] Int. Cl.$^6$ .............................. E02D 27/00; E04H 9/00
[52] U.S. Cl. .............................................. 52/169.6; 52/79.1
[58] Field of Search ................................... 52/169.6, 79.1

[56] References Cited

U.S. PATENT DOCUMENTS

| | | | |
|---|---|---|---|
| 3,727,707 | 4/1973 | Machala | 52/169.6 |
| 4,126,972 | 11/1978 | Silen | 52/169.6 |
| 4,539,780 | 9/1985 | Rice | 52/169.6 |
| 4,615,158 | 10/1986 | Thornton | 52/169.6 |

OTHER PUBLICATIONS

*Concrete Family Shelters*, Mar. 22, 1963, Portland Cement Association.
*Fallout Protection, What to Know and Do About Nuclear Attack*, Dec. 1961, Department of Defense, pp. 20–23.

*Primary Examiner*—Carl D. Friedman
*Assistant Examiner*—W. Glenn Edwards
*Attorney, Agent, or Firm*—Camoriano & Smith

[57] ABSTRACT

A shelter to be used with a mobile home in which the mobile home is positioned on a foundation with an entrance spaced a distance above the ground. The storm shelter defines an enclosed volume for receiving at least one individual and includes a top wall juxtaposed to the mobile home beneath the entrance and extends horizontally away from the home, forming a floor of a stoop. A side wall, secured to the top and bottom walls, extends into and is anchored to the ground. The side wall also has at least one door for access into the interior of said volume.

10 Claims, 4 Drawing Sheets

STORM SHELTER FOR USE WITH A MOBILE HOME

BACKGROUND OF THE INVENTION

This invention relates to storm shelters and more particularly to storm shelters for use with mobile homes without basements.

Mobile homes are particularly susceptible to damage from severe thunderstorms and tornadoes due to their light weight and fragile structure, large sail area, and inadequate or complete absence of an anchoring mechanism. Occupants generally have no means of protection from an approaching tornado or storm. While desirable, mobile homes and the like are generally not provided with any shelter against high winds by owners of the lots upon which the homes are placed.

Mobile home parks usually have a high density population. Lot sizes generally are kept as small as possible to allow for a maximum number of residents. Population density, lack of available land, encroachment of landscaping and costs are significant reasons that tend to preclude construction of storm shelters in mobile home parks. Typical shelters take up considerable room at the sacrifice of some of the features listed above.

U.S. Pat. No. 4,615,158 provides a storms shelter for use with mobile home, It discloses an enclosure communicating the interior of a mobile home. Part of the floor of the mobile home also serves as a trap door opening into the crawl space beneath the home. A flexible grommet defines a space in which a collapsible ladder extends to a point just below the trap door. The invention set forth in the patent does require a significant modification of the mobile home. Additionally it would require precise location of the door to an underground enclosure. It is in essence tailored to a particular home and would not permit ready replacement of the home without the modifications. The shelter also occupies space otherwise usable for other features in the mobile home park. Excavation costs would be increased.

Another U.S. Pat. No. 4,539,780 discloses a fully buried storm cellar composed of two precast concrete sections. Each section includes a part of a stairway and an aligned opening when the sections are assembled they form a complete stairway into the shelter. Again the cellar will occupy more land than is desirable.

A major object of this invention is to provide the mobile home owner with a practical and usable storm shelter that compliments the minimal space requirements of the park.

Another object of the present invention is to provide a mobile home with a storm shelter than collectively occupies no greater space than a mobile home without one.

Still another object of the present invention is to provide a storm shelter which is completely self-contained and does not depend upon the mobile home for any part of its structure.

A further object of the present invention is to provide a mobile home owner with a storm shelter that also serves as a functioning associated accessory to the mobile home without encroaching on adjacent land of the park. In this regard it should be noted that mobile homes generally rest on a small foundation above the ground. As a result, the front door will be above ground level and requires some sort of stairway to be accessible. In many instances either the park owners or the mobile home owners construct not only steps but a small stoop that serves as a front porch to the entry way into the mobile home. The stoop often remains as a permanent feature and can serve other homes when moved into place. Thus, it is still a further object of the present invention to utilize the front stoop associated with the mobile home as part of a storm shelter.

SUMMARY OF THE INVENTION

In accordance with one embodiment of the present, a combination of a mobile home and shelter comprises a mobile home positioned on a foundation with an entrance spaced a distance above the ground and a storm shelter enclosing a shelter space for receiving at least one individual. The shelter space is defined by a top wall, a bottom wall, and at least one side wall. The top wall is releasably connected to the side wall and juxtaposed to the mobile home beneath the entrance, extending horizontally away from the home thereby forming a floor of a stoop for the front entrance.

DETAILED DESCRIPTION OF THE PREFERRED EMBODIMENT

Figure 1:
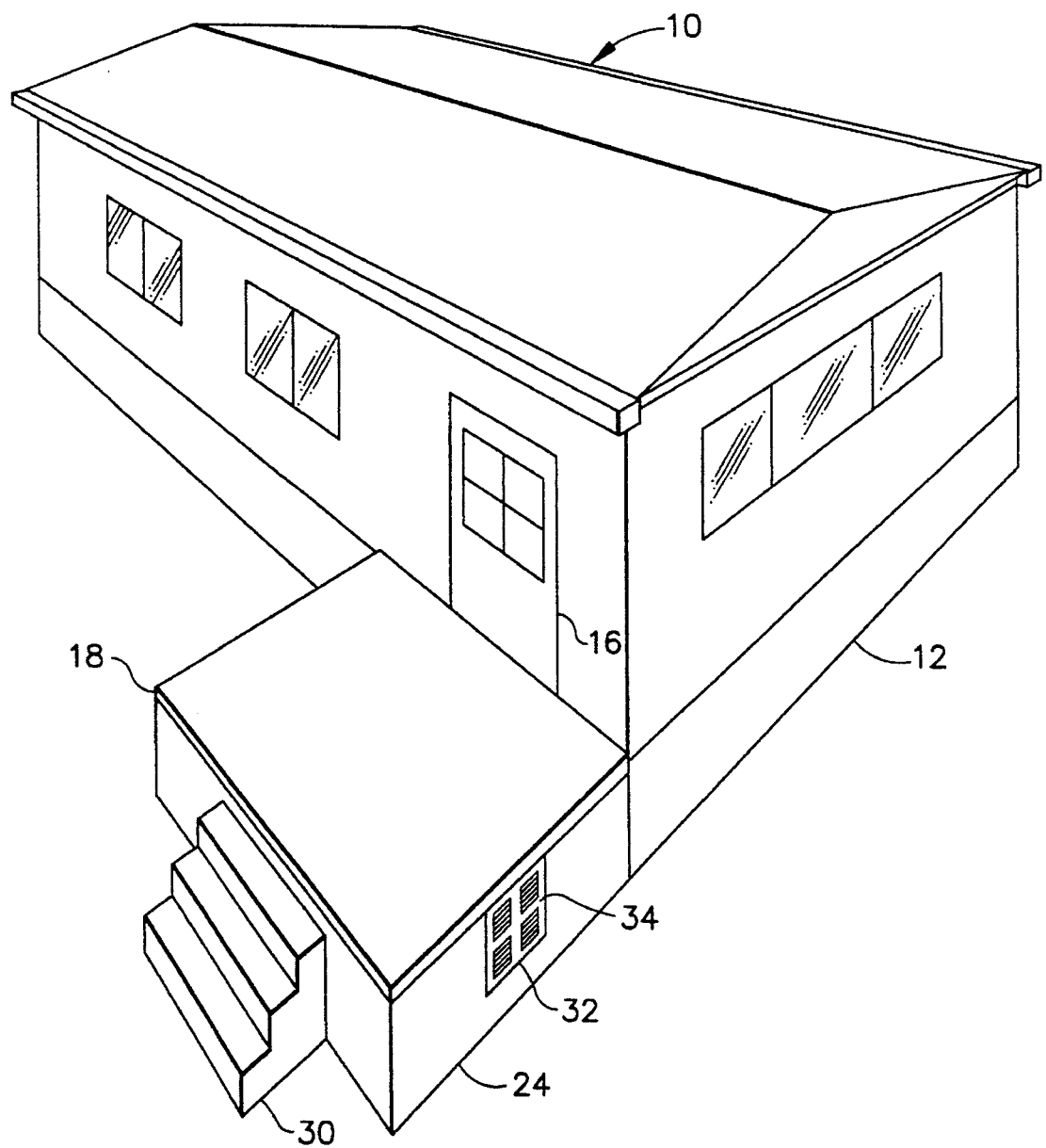
FIG. 1 is a perspective view of a storm shelter constructed in accordance with the present invention serving as a front stoop to a mobile home.
Figure 2:
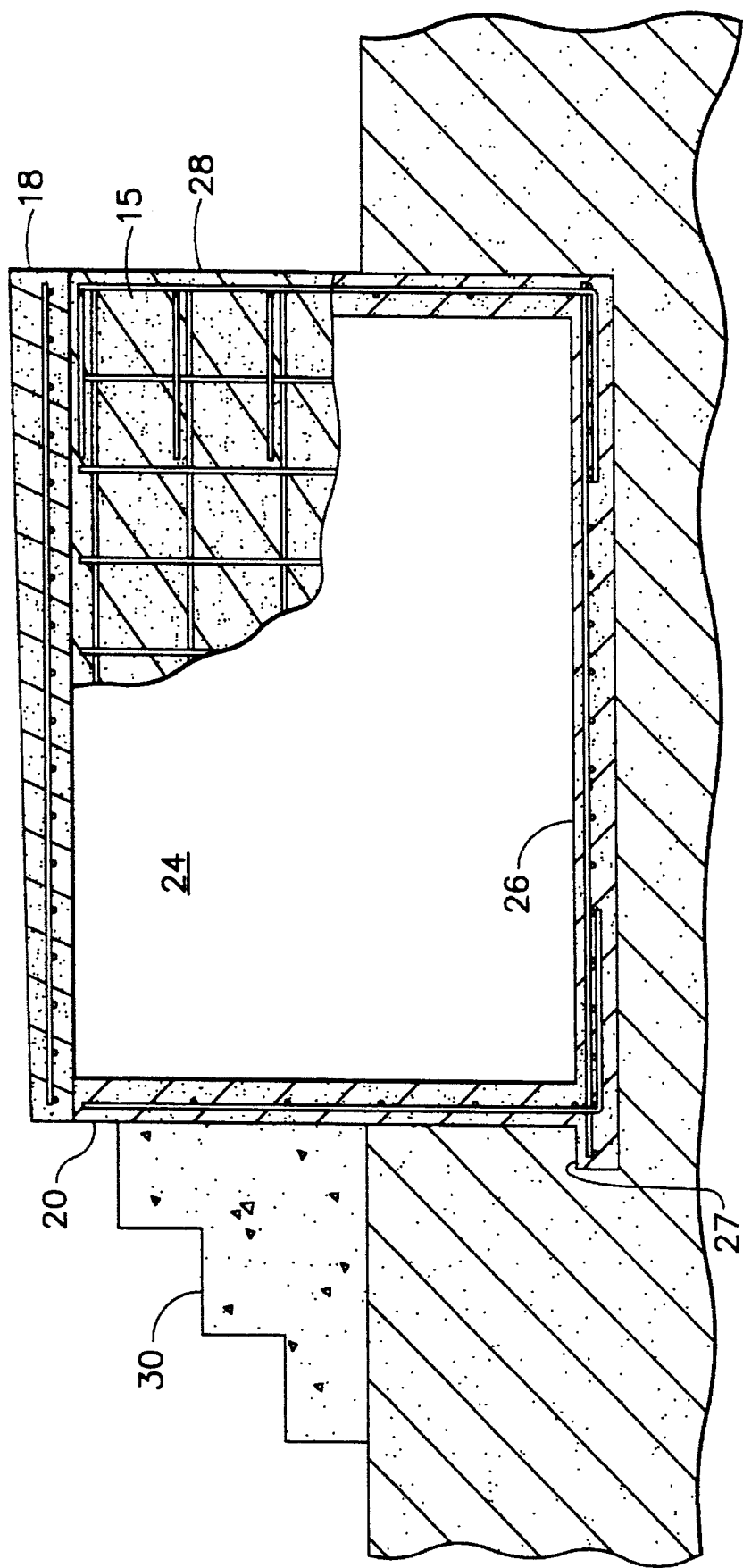
FIG. 2 is a side view, partially in section, of the left side wall of the storm shelter of FIG. 1 without the entry door.
Figure 3:
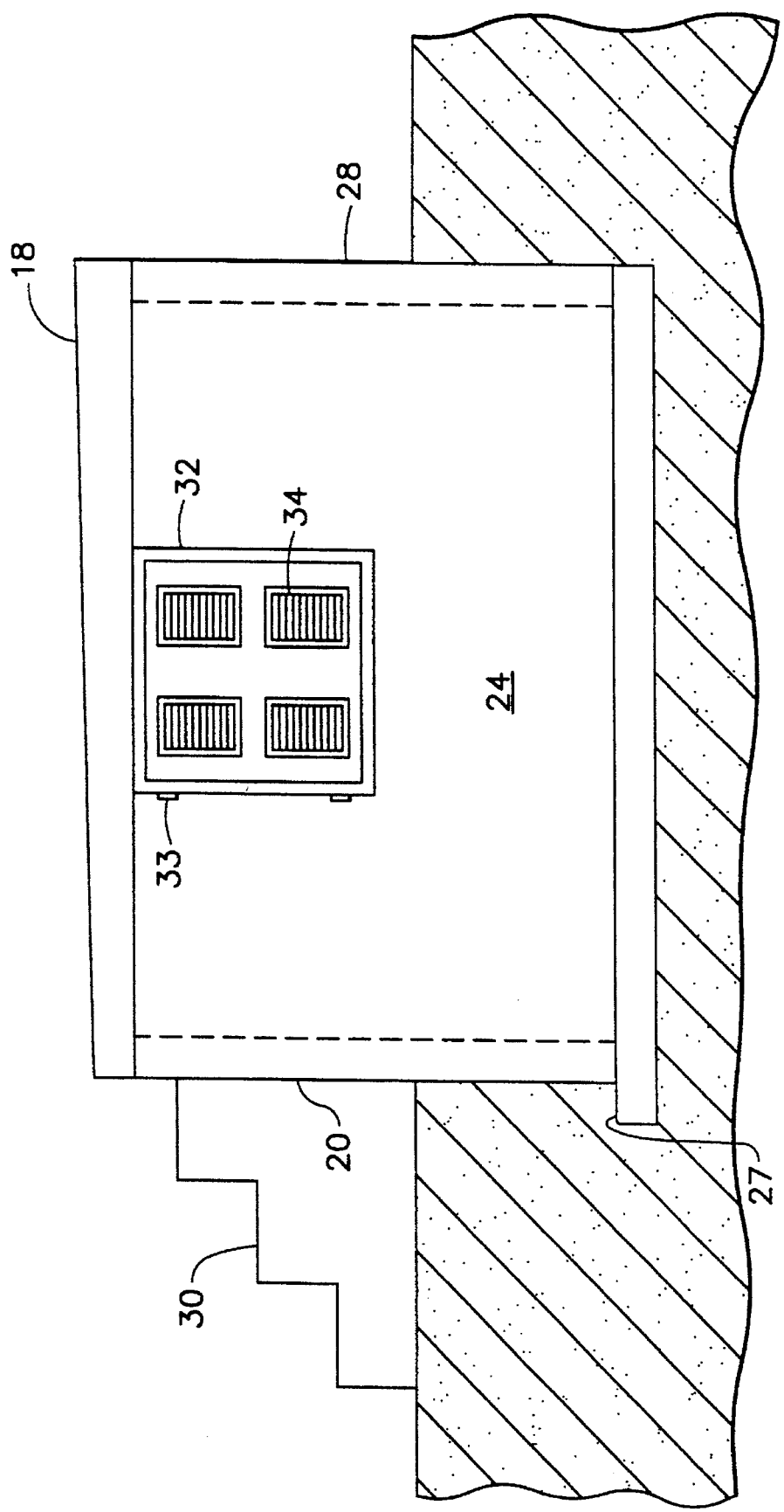
FIG. 3 is a side elevation view of left side of the storm shelter of FIG. 1 showing the entry door.

Referring to FIGS. 1–4, it may be seen, particularly in the perspective of FIG. 1, that a mobile type home, designated by the character numeral 10, sits on a foundation 12 and is associated with storm shelter 14 positioned beneath a front entrance way 16 to home 10. The shelter 14 is defined by a top wall 18, a front wall 20, a right side wall 22, a left side wall 24, a floor 26, and back wall 28, and is preferably positioned so that a portion of the shelter is in the ground about 18 or more inches below the surface. Top wall 18 functions as a floor for a front porch or stoop extending horizontally away from entrance way 16. Steps 30 may be added if necessary to mount the front stoop.

An access door 32, preferably about 2 feet by 2 feet, is shown positioned flush with the exterior surface of left side wall 24 and is mounted for quick entry into the enclosed volume defined by the various walls of shelter 14. It is preferable that the access door be located on the side of the shelter away from the prevailing direction of storms. For example, in the Midwestern part of the United States destructive storms generally approach from the southwest. Thus the preferred location would be on the more eastern side of the shelter. Door 32 itself is preferably pivotally mounted on hinges 33 so as to pivot away from the shelter and not to interfere with the interior thereof. Door 32 may be further provided with vent openings 34 allowing flow of fresh air to the enclosed volume. The vents may be closed from the interior when necessary (not shown).

Figure 5:
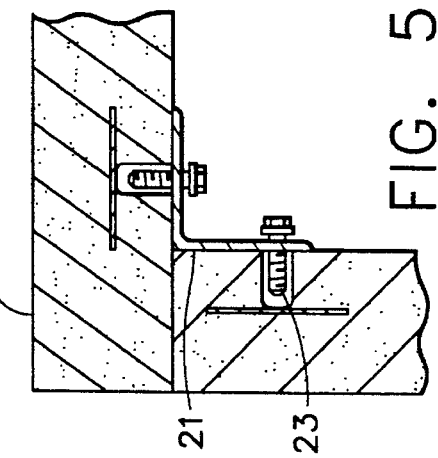
FIG. 5 is a section view of the juncture between the top and one of the sides of a storm shelter in accordance with the present invention showing the structure by which the top and sides are secured together.
Figure 4:
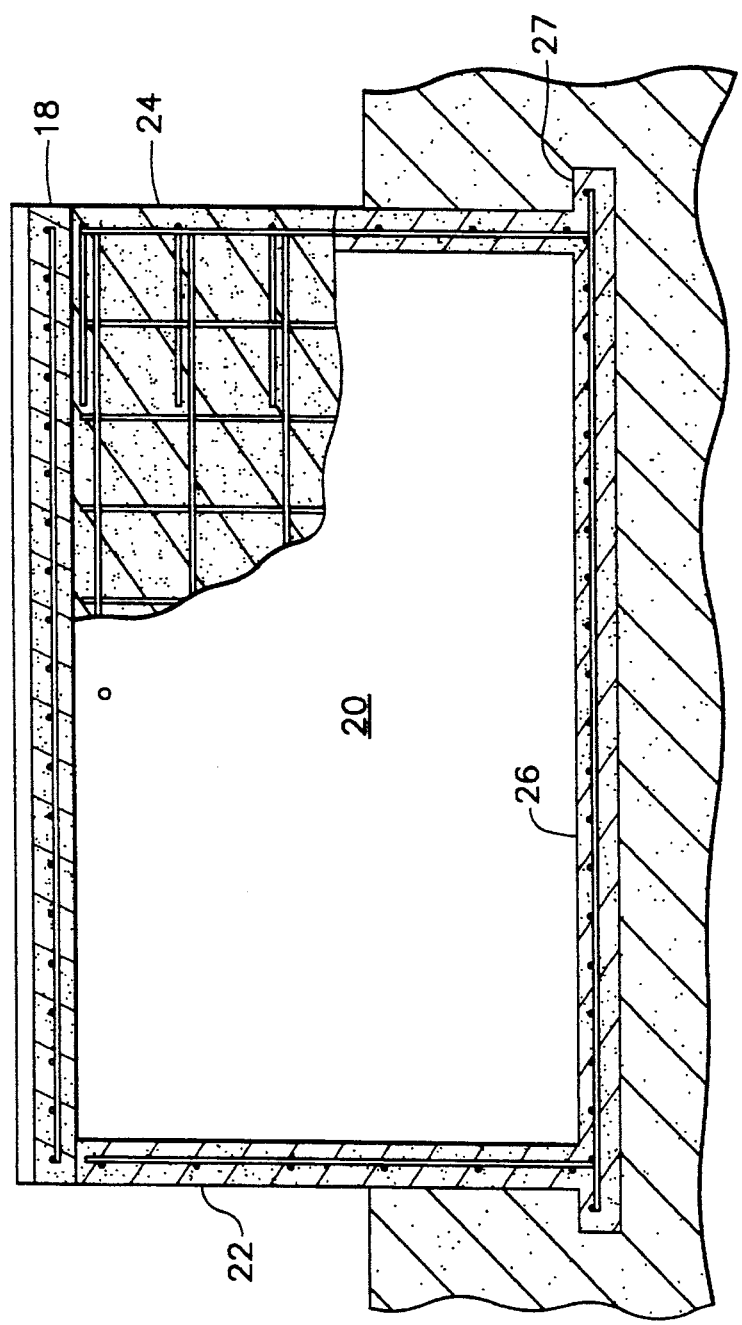
FIG. 4 is a front view, partially in section, of the storm shelter of FIG. 1.

The various walls of shelter 14 are made from preferably precast reinforced concrete with a minimum 28 day compressive strength of about 5000 psi at least about 5 inches thick. As seen in the side sectional view of FIG. 2, the concrete is reinforced with a mesh of steel wire 15. The floor 26 and side walls 22, 24 are preferably precast as a singular unit supporting the top wall 18. As illustrated in FIG. 5, top wall 18 is firmly secured to the perimeter formed by the front, back and side walls by a plurality of right angle brackets 21 and bolts 23. Top wall 18 may be slightly sloped to allow water to readily drain.

Shelter 14 is essentially immovable by wind velocities of even tornadic values by virtue of its weight and position with accomplished by ensuring that floor 26 is precast to overlap front wall 20 and side wall 22 and 24 forming a platform 27 around the lower perimeter of shelter 14 extending away from the mobile home 10. The overlapping platform 27 serves to provide the more effective anchoring of the shelter 14.

Thus, stoops with steps may be constructed in accordance with the above at the positions desired in a mobile home park and mobile homes can be located so that the front entrance way is above the stoop. No further excavation tailored for the home is necessary and no additional park space is required. When the occupants of the home are given warning to take cover, they merely proceed to the entrance way into the volume defined by the stoop, remove the door and go inside. The door way can be replaced and the vents momentarily covered until the danger has passed. Because the volume is entirely defined by reinforced concrete the danger from flying debris or collapsing ceilings is minimized.

It is understood that in light of a reading of the foregoing description and drawings that those with ordinary skill in the art will be able to make changes and modifications to the present invention without departing from the spirit or scope of the invention as defined in the following appended claims. For example, while the figures depict two side walls, a front wall and a back wall forming a parallelpiped-type geometric structure, it is clear that other volume configurations could be used such as a cylindrical shape with a single side wall.

I claim:

1. A combination of a mobile home and shelter comprising a mobile home positioned on a foundation with an entrance spaced a distance above the ground and a storm shelter defining an enclosed volume for receiving at least one individual, said shelter including a top wall juxtaposed to said mobile home beneath said entrance and extending horizontally away from said mobile home thereby forming a floor of a stoop;

at least one side wall secured to said top wall and extending into and anchored to the ground;

a bottom wall secured to said side wall wherein said side wall has at least one door for access into the interior of said volume.

2. The combination of claim 1 wherein said bottom wall extends horizontally past the side wall to aid in the anchoring of said shelter.

3. The combination of claim 2 wherein said shelter has a front wall, back wall, and a pair of side walls, said bottom wall extending from said back wall horizontally past the side and front walls forming a platform about the perimeter of the shelter extending from said mobile home thereby anchoring said shelter into the ground.

4. The combination of claim 1 wherein said shelter walls and top are precast concrete with a minimum 28 day compressive strength of about 5000 psi allowing said shelter to withstand winds in excess of 130 mph.

5. The combination of claim 1 in which said bottom wall and said at least one side wall are precast as one unit and said top wall is precast as another unit, said top wall being detachably secured to said side wall.

6. A storm shelter for a mobile home adapted to be positioned beneath the front entrance of the mobile home resting on a foundation, said shelter having an enclosed volume for receiving at least one individual in which said volume is defined by a top wall positioned with one end thereof adjacent to the mobile home beneath said entrance and extending horizontally away from the foundation thereby forming a floor of a stoop for the mobile home;

at least one side wall secured to said top wall and extending into and anchored to the ground; and a bottom wall secured to said side wall wherein said side wall has at least one door for access into the interior of said volume.

7. The shelter of claim 6 having an anchoring structure defined by said bottom wall extending horizontally past the side wall.

8. The shelter of claim 7 wherein said shelter has a front wall, back wall, and a pair of side walls, said bottom wall extending from said back wall horizontally pass the side and front walls forming a platform about the perimeter of the shelter extending from said mobile home.

9. The shelter of claim 6 wherein said shelter walls and top are precast concrete with a minimum 28 day compressive strength of about 5000 psi allowing said shelter to withstand winds in excess of 130 mph.

10. The shelter of claim 6 in which said bottom wall and said at least one side wall are precast as one unit and said top wall is precast as another unit, said top wall being detachably secured to said side wall.

* * * * *